US012779874B2

(12) United States Patent
Ogawa et al.

(10) Patent No.: US 12,779,874 B2
(45) Date of Patent: Nov. 3, 2026

(54) INKJET PRINTING APPARATUS

(71) Applicant: SCREEN Holdings Co., Ltd., Kyoto (JP)

(72) Inventors: Akihiro Ogawa, Kyoto (JP); Takuya Ito, Kyoto (JP); Hideaki Onishi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 108 days.

(21) Appl. No.: 19/021,423

(22) Filed: Jan. 15, 2025

(65) Prior Publication Data

US 2025/0276529 A1 Sep. 4, 2025

(30) Foreign Application Priority Data

Feb. 29, 2024 (JP) ................................ 2024-029380

(51) Int. Cl.
*B41J 2/18* (2006.01)
*B41J 2/175* (2006.01)

(52) U.S. Cl.
CPC ............ *B41J 2/18* (2013.01); *B41J 2/17596* (2013.01); *B41J 2202/12* (2013.01)

(58) Field of Classification Search
CPC ...... B41J 2/18; B41J 2/17596; B41J 2202/12; B41J 2/175
See application file for complete search history.

(56) References Cited

U.S. PATENT DOCUMENTS

2011/0050794 A1* 3/2011 Koike .................. B41J 2/17596 347/85
2021/0197555 A1 7/2021 Fukasawa et al.

FOREIGN PATENT DOCUMENTS

JP 2023-053103 A 4/2023

* cited by examiner

*Primary Examiner* — Bradley W Thies
(74) *Attorney, Agent, or Firm* — Rimon P.C.

(57) ABSTRACT

This inkjet printing apparatus includes an ink circulation path in which a circulation pump that circulates ink and a heater that heats circulating ink are interposed. A control unit can sequentially perform a step (a) of, upon receipt of a signal regarding a command for stopping driving the circulation pump, stopping driving the heater, and determining a circulation duration for which the circulation pump is kept operating and ink circulation in the circulation path is continued, on the basis of a duty value of the heater for a predetermined time period before the time of receipt of the signal and a flow rate of ink in the circulation path for the predetermined time period, and a step (b) of stopping driving the circulation pump after the elapse of the circulation duration.

3 Claims, 5 Drawing Sheets

INKJET PRINTING APPARATUS

RELATED APPLICATIONS

This application claims the benefit of Japanese application No. 2024-029380, filed on 29 Feb. 2024, the disclosure of which is incorporated by reference herein.

BACKGROUND OF THE INVENTION

Field of the Invention

The present invention relates to an inkjet printing apparatus that discharges ink onto a printing medium such as paper to perform printing.

Description of the Background Art

Conventionally, an inkjet printing apparatus includes an ink circulation path through which ink is supplied to a discharge head configured to discharge ink onto a printing medium, and ink being left undischarged in the discharge head is collected and again supplied to the discharge head, in some cases. An inkjet printing apparatus including such an ink circulation path as mentioned above is described in, for example, Japanese Patent Application Laid-Open No. 2023-053103.

In an inkjet recording apparatus (1) of Japanese Patent Application Laid-Open No. 2023-053103, a circulation-type ink supply system is adopted. In the inkjet recording apparatus (1), an ink supply unit (15) is provided at some midpoint in a passage connecting a recording head (8) for discharging ink and an ink tank unit (14) in which ink supplied to the recording head (8) is stored. The ink supply unit (15) adjusts a pressure of ink supplied to the recording head (8) and a flow rate of ink collected from the recording head (8) to an appropriate range (paragraph [0016]). Further, a sub-heater not shown that heats ink in the recording head (8) to adjust a temperature is provided (paragraph [0088]).

In the inkjet recording apparatus (1) of Japanese Patent Application Laid-Open No. 2023-053103, ink circulation starts when a recording operation is performed, and ink circulation stops when a recording operation ends. By ink circulation, ink that begins to be thickened in the vicinity of a discharge port (1006) of the recording head (8) is diffused in the passage. Thus, it is possible to prevent thickened ink from accumulating in the vicinity of the discharge port (1006). Consequently, it is possible to prevent ink from failing to be properly discharged due to adhesion of thickened ink in the vicinity of the discharge port (1006) (paragraphs [0048], [0049], and [0063]).

Here, in a case in which a recording operation is completed in a short time period, ink circulation also is over in a short time period commensurately with a recording time period. In this case, thickening of ink in the vicinity of the discharge port (1006) cannot be satisfactorily eliminated (paragraph [0050]). Then, in the inkjet recording apparatus (1) of Japanese Patent Application Laid-Open No. 2023-053103, in a case in which a recording operation is completed in a short time period, a process of further continuing circulation for a predetermined time period is performed in addition to ink circulation performed commensurately with the recording operation. More specifically, it is determined whether an elapsed time period (Tc) from a starting time (Ts) of circulation is shorter than a preset value (Tmin). When the elapsed time period (Tc) is shorter than the preset value (Tmin), circulation is continued for a predetermined time period (Tadd) also after the end of the recording operation. Note that the preset value (Tmin) and the value of the time period (Tadd) for which circulation is continued can be appropriately set. Thus, thickened ink in the vicinity of the discharge port (1006) is diffused in the passage, so that thickening of ink in the vicinity of the discharge port (1006) can be eliminated (paragraphs and) [0061]).

However, in Japanese Patent Application Laid-Open No. 2023-053103 described above, the time period for which circulation should be continued in order to eliminate thickening of ink is highly likely to depend largely on a driving condition of the sub-heater that heats ink and a flow rate of ink circulating through the passage. Hence, to set a time period for which circulation is continued without consideration of those factors would cause a fear that the time period might be more lengthy than necessary or be insufficient. Further, there are many points in time when ink circulation is required to be stopped, other than after the end of a recording operation.

SUMMARY OF THE INVENTION

It is an object of the present invention to provide a technology that makes it possible to determine a time period for which ink circulation should be continued with consideration given to a driving condition of a heater and a flow rate of circulating ink before the time of receipt of a command for stopping ink circulation in a case in which such a command is received.

To solve the above-described problem, the first invention of the present application is directed to an inkjet printing apparatus that discharges ink onto a printing medium to perform printing, and includes an ink circulation path, a circulation pump, a heater, an input unit, and a control unit. The circulation path includes a discharge head configured to discharge ink, a supply tank in which ink supplied to the discharge head is stored, a collecting tank in which ink collected from the discharge head is stored, and a feedback pipe connecting the collecting tank and the supply tank. The circulation pump is interposed in the feedback pipe and is configured to deliver ink from the collecting tank to the supply tank via the feedback pipe. The heater is interposed in the feedback pipe and is configured to heat ink flowing from the collecting tank to the supply tank. The input unit is configured to receive a command for stopping driving the circulation pump. The control unit is electrically connected to each of the circulation pump, the heater, and the input unit. The control unit is capable of sequentially performing a step (a) of, upon receipt of a signal regarding the command from the input unit, stopping driving the heater, and determining a circulation duration for which the circulation pump is kept operating and ink circulation in the circulation path is continued from a time of receipt of the signal, on the basis of a duty value of the heater for a predetermined time period before the time of receipt of the signal and a flow rate of ink in the circulation path for the predetermined time period, and a step (b) of stopping driving the circulation pump after elapse of the circulation duration from the time of receipt of the signal.

The second invention of the present application is directed to the inkjet printing apparatus according to the first invention, wherein the circulation duration is inversely proportional to the flow rate of ink in the circulation path for the predetermined time period.

The third invention of the present application is directed to the inkjet printing apparatus according to the first or second invention, wherein the circulation duration is proportional to the duty value of the heater for the predetermined time period.

According to the first to third inventions of the present application, in a case in which a command for stopping ink circulation is received, the heater is stopped operating while ink circulation is continued. Thus, the temperature of the heater can be reduced. This can suppress a change in quality or the like of ink left in the heater. Further, a time period for which ink circulation is continued is determined by a duty value of the heater and a flow rate of circulating ink, and therefore the time period can be minimized.

Especially, according to the second invention of the present application, the higher the flow rate of ink is, the more efficiently the temperature of the heater can be reduced in circulating ink. This can shorten the circulation duration.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
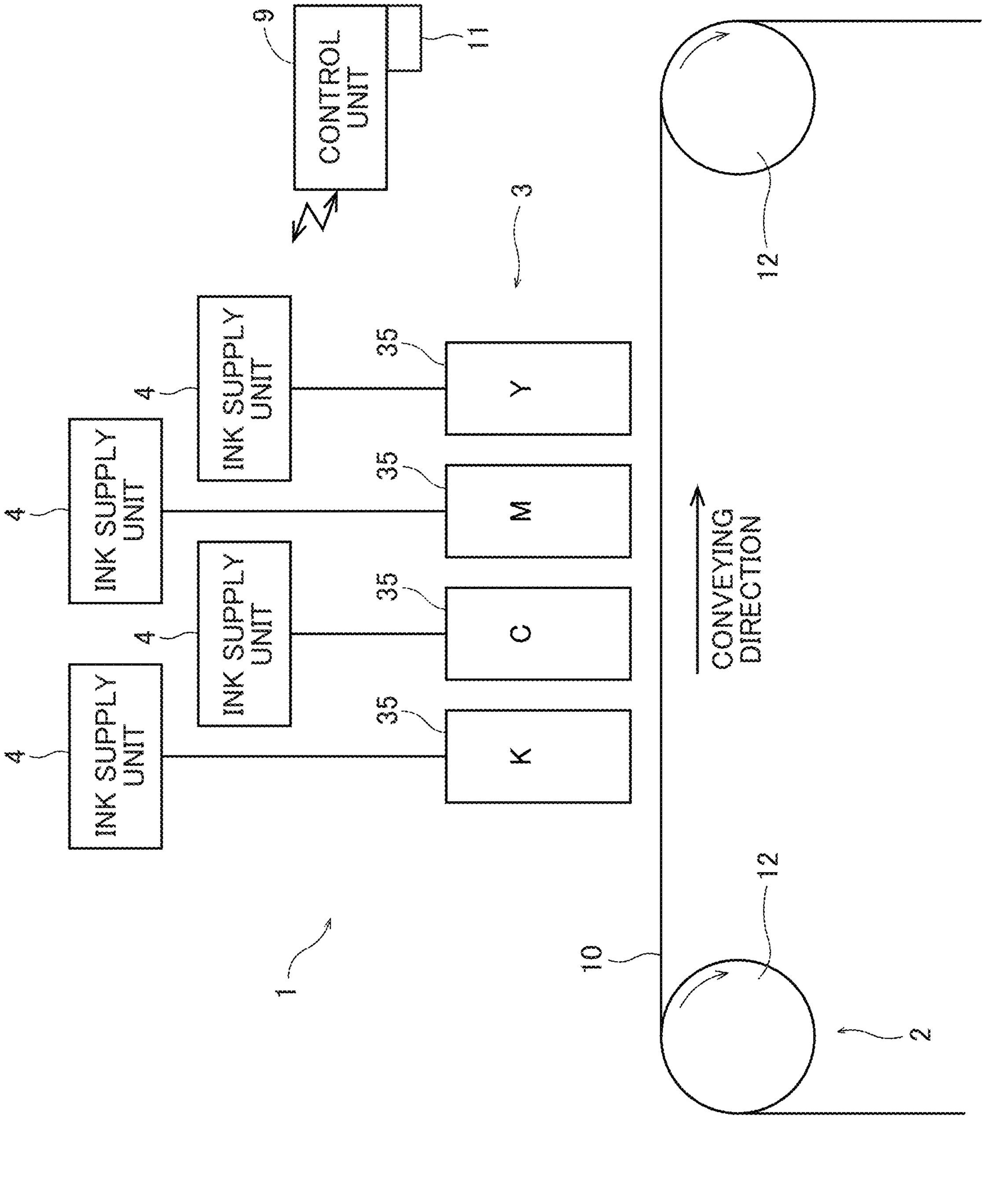
FIG. 1 is a view conceptually showing a configuration of an inkjet printing apparatus.

Hereinafter, a preferred embodiment of the present invention will be described with reference to the drawings. Note that components described in the preferred embodiment are mere examples and are not intended to limit the scope of the present invention to those only. In the drawings, for the purpose of easier understanding, the dimensions or the number of respective components are overstated or understated in some portions of illustration, as necessary.

<1. Configuration of Inkjet Printing Apparatus>

FIG. 1 is a view conceptually showing a configuration of an inkjet printing apparatus 1 according to one preferred embodiment of the present invention. The inkjet printing apparatus 1 is an inkjet printing machine that discharges droplets of water-based ink onto continuous paper 10 being in a shape of a long strip from a plurality of discharge heads 35 while conveying the continuous paper 10, to record characters or images on a surface of the continuous paper 10. Note that the continuous paper 10 in a shape of a long strip is just one example of a printing medium. The printing medium may be a cut sheet, a plastic film, cardboard, metal foil, a glass material, or the like. In other words, the inkjet printing apparatus 1 may be any apparatus that can discharge ink onto a printing medium to perform printing. As shown in FIG. 1, the inkjet printing apparatus 1 includes a conveyor unit 2, a printing unit 3, a control unit 9, and an input unit 11.

The conveyor unit 2 is a mechanism configured to convey the continuous paper 10 along a predetermined conveying path in a conveying direction extending along a length direction of the continuous paper 10. The continuous paper 10 is stretched over a plurality of conveyor rollers 12. The continuous paper 10 is conveyed along a conveying path formed by the plurality of conveyor rollers 12. Each of the conveyor rollers 12 rotates about an axis extending in a direction perpendicular to the conveying direction, to thereby guide the continuous paper 10 to the downstream side in the conveying path. Further, the continuous paper 10 is under tension in the conveying direction. This reduces slack or wrinkles in the continuous paper 10 during conveying.

The printing unit 3 includes a plurality of discharge heads 35 and a plurality of ink supply units 4. In the present preferred embodiment, the printing unit 3 includes four discharge heads 35 and four ink supply units 4. The four discharge heads 35 have substantially the same configuration with each other. Further, the four ink supply units 4 have substantially the same configuration with each other.

The four discharge heads 35 are arranged while being spaced from each other along the conveying direction. Each of the four discharge heads 35 discharges ink droplets onto a surface (upper surface) of the continuous paper 10 from nozzles 83 (refer to FIG. 2 described later). In the present preferred embodiment, the four discharge heads 35 discharge ink of different colors, respectively, to thereby each record a monochromatic image on the surface (upper surface) of the continuous paper 10. In the present preferred embodiment, for example, the four discharge heads 35 discharge cyan ink, magenta ink, yellow ink, and black ink, respectively. Then, the four monochromatic images are superimposed, so that a multicolor image is formed on the upper surface of the continuous paper 10.

Figure 2:
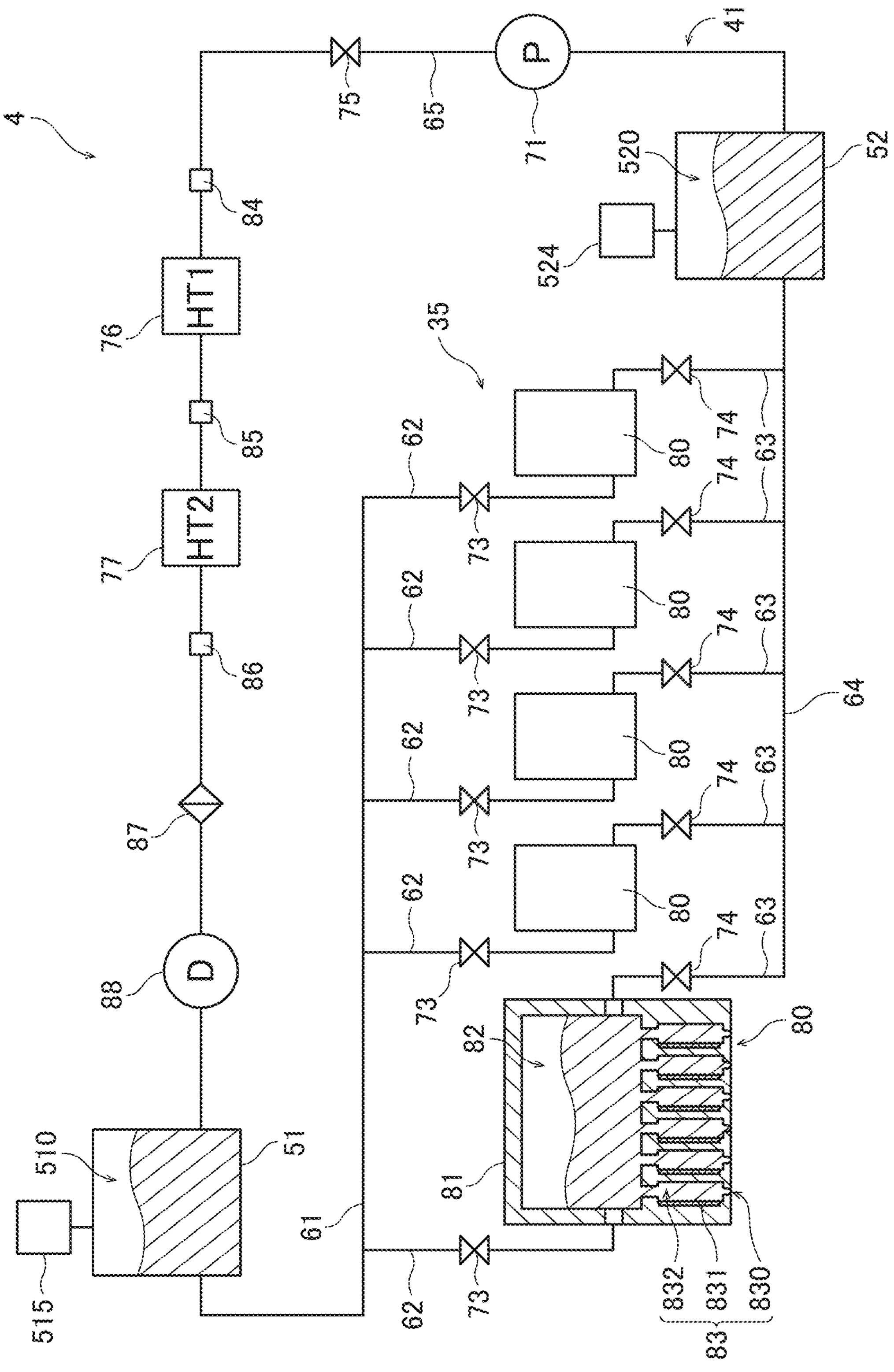
FIG. 2 is a view conceptually showing configurations of an ink supply unit and a discharge head.

FIG. 2 is a view conceptually showing a configuration of one ink supply unit 4 and a configuration of one discharge head 35. In the present preferred embodiment, each of the discharge heads 35 includes a plurality of heads 80. In the present preferred embodiment, each of the discharge heads 35 includes five heads 80. The five heads 80 have substantially the same configuration with each other. Hence, in FIG. 2, only one of the five heads 80 is shown in detail, and the other four heads 80 are shown in a simplified manner. As shown in FIG. 2, each of the five heads 80 includes a casing 81, an internal tank 82, and a plurality of nozzles 83.

The casing 81 forms an outer frame of the head 80. The internal tank 82 is provided in the casing 81, and ink can be temporarily stored therein. The plurality of nozzles 83 are arranged while being equally spaced from each other along the conveying direction and a width direction of the continuous paper 10 in a lower portion of the casing 81. Each of the plurality of nozzles 83 communicates with the internal tank 82. Further, each of the plurality of nozzles 83 includes a plurality of piezoelectric elements 831 serving as pressure generation elements, an ink chamber 832, and a discharge port 830. The ink chamber 832 communicates with the internal tank 82.

During discharge of ink, ink flows down from the internal tank 82 to the ink chamber 832. Then, under the control of the piezoelectric elements 831, ink in the ink chamber 832 is pressurized, and thus is discharged in the form of liquid droplets from the discharge port 830. Alternatively, the nozzle 83 may be a so-called thermal nozzle in which ink in the ink chamber 832 is heated to generate bubbles and thus is pressurized.

Next, the ink supply unit 4 is described. The ink supply unit 4 is a device configured to supply ink to the discharge heads 35 while circulating a part of ink. As described above, the inkjet printing apparatus 1 of the present preferred embodiment includes four ink supply units 4. The four ink supply units 4 have substantially the same configuration with each other, and hence only a configuration of one ink supply unit 4 is described below.

As shown in FIG. 2, each of the ink supply units 4 includes a supply tank 51, a collecting tank 52, a supply-side manifold 61, a plurality of supply-side narrow pipes 62, a plurality of collecting-side narrow pipes 63, a collecting-side manifold 64, a feedback pipe 65, a circulation pump 71, a plurality of supply-side on-off valves 73, a plurality of head outlet-side on-off valves 74, a feedback-side on-off valve 75, a first heater 76, a second heater 77, a first temperature sensor 84, a second temperature sensor 85, a third temperature sensor 86, a filter 87, and a deaeration unit 88. In the present preferred embodiment, each of the ink supply units 4 includes five supply-side narrow pipes 62, five collecting-side narrow pipes 63, five supply-side on-off valves 73, and five head outlet-side on-off valves 74.

The supply tank 51 is a container for temporally storing ink to be supplied to the discharge heads 35. In the supply tank 51, an internal chamber 510 in which ink can be temporally stored is provided. Meanwhile, in the supply tank 51, a liquid-level sensor for detecting a liquid level of ink stored in the internal chamber 510 of the supply tank 51 may be provided.

The supply-side manifold 61 and the five supply-side narrow pipes 62 are pipes connecting the supply tank 51 and the five heads 80 included in one discharge head 35. The supply-side manifold 61 is a wide pipe having an upstream end that is connected so as to communicate with the internal chamber 510 of the supply tank 51. Each of the five supply-side narrow pipes 62 is a narrow pipe branching from the supply-side manifold 61. Each of the five supply-side narrow pipes 62 has an upstream end communicating with an internal passage of the supply-side manifold 61, and has a downstream end that is connected so as to communicate with the internal tank 82 of one head 80.

Further, in the present preferred embodiment, the supply-side on-off valve 73 is interposed in each of the supply-side narrow pipes 62. For the supply-side on-off valve 73, for example, a solenoid valve that is opened and closed under the control of the control unit 9 is used. Alternatively, for the supply-side on-off valve 73, an on-off valve that is manually opened and closed may be used. While the supply-side on-off valve 73 is closed, an internal passage of the supply-side narrow pipe 62 is blocked from communicating. That is, while the supply-side on-off valve 73 is closed, ink flow from the supply tank 51 to the head 80 is interrupted. Meanwhile, while the supply-side on-off valve 73 is opened, the internal passage of the supply-side narrow pipe 62 is allowed to communicate. Note that the supply-side on-off valve 73 is not necessarily required to be provided. Further, a filter or the like may be further interposed in the supply-side manifold 61 or each of the five supply-side narrow pipes 62.

The five collecting-side narrow pipes 63 and the collecting-side manifold 64 are pipes connecting the five heads 80 included in one discharge head 35 and the collecting tank 52. Each of the five collecting-side narrow pipes 63 is a narrow pipe branching from the collecting-side manifold 64. Each of the five collecting-side narrow pipes 63 has an upstream end that is connected so as to communicate with the internal tank 82 of one head 80, and has a downstream end that is connected so as to communicate with an internal passage of the collecting-side manifold 64. The collecting-side manifold 64 is a wide pipe having a downstream end that is connected so as to communicate with the internal chamber 520 of the collecting tank 52 described later.

Further, in the present preferred embodiment, the head outlet-side on-off valve 74 is interposed in each of the collecting-side narrow pipes 63. For the head outlet-side on-off valve 74, for example, a solenoid valve that is opened and closed under the control of the control unit 9 is used. Alternatively, for the head outlet-side on-off valve 74, an on-off valve that is manually opened and closed may be used. While the head outlet-side on-off valve 74 is closed, an internal passage of the collecting-side narrow pipe 63 is blocked from communicating. That is, while the head outlet-side on-off valve 74 is closed, ink flow from the head 80 to the collecting tank 52 is interrupted. Meanwhile, while the head outlet-side on-off valve 74 is opened, the internal passage of the collecting-side narrow pipe 63 is allowed to communicate. Note that the head outlet-side on-off valve 74 is not necessarily required to be provided. Further, a filter or the like may be further interposed in each of the five collecting-side narrow pipes 63 or the collecting-side manifold 64.

The collecting tank 52 is a container for temporally storing ink collected from the discharge heads 35. In the collecting tank 52, the internal chamber 520 in which ink can be temporally stored is provided. Meanwhile, in the collecting tank 52, a liquid-level sensor for detecting a liquid level of ink stored in the internal chamber 520 of the collecting tank 52 may be provided.

Further, as shown in FIG. 2, the supply tank 51 is connected to a pressurization mechanism 515. The pressurization mechanism 515 pressurizes the inside of the supply tank 51, to regulate a pressure of the internal chamber 510 of the supply tank 51 to a positive pressure. That is, the pressurization mechanism 515 pressurizes the inside of the supply tank 51, to regulate a pressure of the internal chamber 510 of the supply tank 51 to a pressure higher than the atmospheric pressure. The pressurization mechanism 515 includes, for example, a compressor, a pressurization buffer tank, a pressure regulation mechanism (regulator), and the like. Meanwhile, the collecting tank 52 is connected to a decompression mechanism 524. The decompression mechanism 524 decompresses the inside of the collecting tank 52, to regulate a pressure of the internal chamber 520 of the collecting tank 52 to a negative pressure. That is, the decompression mechanism 524 decompresses the inside of the collecting tank 52, to regulate a pressure of the internal chamber 520 of the collecting tank 52 to a pressure lower than the atmospheric pressure. The decompression mechanism 524 includes, for example, a vacuum pump, a decompression buffer tank, a pressure regulation mechanism (regulator), and the like.

The pressurization mechanism 515 and the decompression mechanism 524 are configured such that the operations thereof can be controlled by the control unit 9. When the pressurization mechanism 515 and the decompression mechanism 524 are driven, there is generated a pressure difference between the internal chamber 510 of the supply tank 51 and the internal chamber 520 of the collecting tank 52. As a result, ink stored in the supply tank 51 can be supplied to the discharge heads 35, and further, ink remaining in the discharge heads 35 can be collected into the collecting tank 52. Note that the ink remaining in the discharge heads 35 is ink being left undischarged in the discharge heads 35.

Note that the pressurization mechanism 515 and the decompression mechanism 524 are not necessarily, required to make a pressure of the internal chamber 510 of the supply tank 51 positive and required to make a pressure of the internal chamber 520 of the collecting tank 52 negative, as long as those pressures can be adjusted such that the pressure of the internal chamber 510 of the supply tank 51 is higher than the pressure of the internal chamber 520 of the collecting tank 52. For example, the pressurization mechanism 515 may adjust a pressure of the internal chamber 510 of the supply tank 51 to a pressure equal to the atmospheric pressure, and the decompression mechanism 524 may adjust a pressure of the internal chamber 520 of the collecting tank 52 to a negative pressure. That is, the pressurization mechanism 515 may adjust a pressure of the internal chamber 510 of the supply tank 51 to a pressure equal to the atmospheric pressure, and the decompression mechanism 524 may adjust a pressure of the internal chamber 520 of the collecting tank 52 to a pressure lower than the atmospheric pressure.

The feedback pipe 65 is a pipe connecting the internal chamber 520 of the collecting tank 52 and the internal chamber 510 of the supply tank 51 in such a manner as to allow the internal chambers to communicate with each other. In other words, the feedback pipe 65 connects the collecting tank 52 and the supply tank 51. As shown in FIG. 2, an internal passage of the feedback pipe 65 has an upstream end that is connected so as to communicate with the internal chamber 520 of the collecting tank 52. Further, the internal passage of the feedback pipe 65 has a downstream end that is connected so as to communicate with the internal chamber 510 of the supply tank 51.

With the above-described configuration, there is formed an ink circulation path 41 that starts from the supply tank 51, extends through the supply-side manifold 61, the supply-side narrow pipes 62, the internal tanks 82 of the discharge heads 35, the collecting-side narrow pipes 63, the collecting-side manifold 64, the collecting tank 52, and the feedback pipe 65, and returns back to the supply tank 51. That is, the ink circulation path 41 includes the supply tank 51, the discharge heads 35, the collecting tank 52, and the feedback pipe 65. Further, in the feedback pipe 65, the circulation pump 71, the feedback-side on-off valve 75, the first heater 76, the second heater 77, the first temperature sensor 84, the second temperature sensor 85, the third temperature sensor 86, the filter 87, and the deaeration unit 88 are interposed.

The circulation pump 71 is a device configured to perform a pumping operation of delivering ink from the collecting tank 52 to the supply tank 51 via the feedback pipe 65. The circulation pump 71 generates ink flow from the collecting tank 52 to the supply tank 51 in the internal passage of the feedback pipe 65 in response to an operation signal from the control unit 9. For the circulation pump 71 of the present preferred embodiment, for example, a pump in which foreign matters such as dust are unlikely to be generated during driving, such as a diaphragm pump, is used. The circulation pump 71 applies a pressure to ink in the circulation pump 71 by reciprocation of a piston therein. Then, the circulation pump 71 discharges ink from an outlet communicating with the internal passage of the feedback pipe 65. Further, the circulation pump 71 is electrically connected to the control unit 9. The circulation pump 71 outputs data regarding a value calculated from “a load factor×a ratio of a time period of an ON state to a unit time period”, to the control unit 9. Note that the unit time period is, for example, one second. Hereinafter, the value calculated from “a load factor×a ratio of a time period of an ON state to a unit time period” will be referred to as a “pump duty value” in order to be distinguished from duty values of the first and second heaters 76 and 77 described later.

The feedback-side on-off valve 75 is interposed on the downstream side of the circulation pump 71 with respect to an ink delivery direction and on the upstream side of the first heater 76 and the second heater 77 with respect to the ink delivery direction in the feedback pipe 65. For the feedback-side on-off valve 75, for example, a solenoid valve that is opened and closed under the control of the control unit 9 is used. Alternatively, for the feedback-side on-off valve 75, an on-off valve that is manually opened and closed may be used. While the feedback-side on-off valve 75 is closed, the internal passage of the feedback pipe 65 is blocked from communicating. That is, while the feedback-side on-off valve 75 is closed, ink flow from the collecting tank 52 to the supply tank 51 and backflow of ink from the supply tank 51 to the collecting tank 52 are prevented. Meanwhile, while the feedback-side on-off valve 75 is opened, the internal passage of the feedback pipe 65 is allowed to communicate. Thus, the feedback-side on-off valve 75 allows or interrupts ink flow from the collecting tank 52 to the supply tank 51.

The first heater 76 is a device configured to heat ink delivered through the internal passage of the feedback pipe 65. The first heater 76 heats ink flowing from the collecting tank 52 to the supply tank 51. The first heater 76 is positioned between the circulation pump 71 and the supply tank 51 in the feedback pipe 65. The first heater 76 includes a heating element formed of a carbon heater or the like and is connected to a power supply via an ON/OFF circuit not shown. Then, the first heater 76 can heat ink by generating heat in an ON state in which power is turned on. Further, the first heater 76 is controlled such that, for example, a temperature of ink passing through the first heater 76 is adjusted toward 30° C. as a desired temperature, by switching between an ON state and an OFF state.

The second heater 77 is a device configured to heat ink delivered through the internal passage of the feedback pipe 65. The second heater 77 heats ink flowing from the collecting tank 52 to the supply tank 51. The second heater 77 is positioned between the first heater 76 and the supply tank 51 in the feedback pipe 65. That is, the second heater 77 is positioned on the downstream side of the first heater 76 with respect to the ink delivery direction. The second heater 77 includes a heating element formed of a carbon heater or the like and is connected to the power supply via the ON/OFF circuit not shown. Then, the second heater 77 can heat ink by generating heat in an ON state in which power is turned on. Further, the second heater 77 is controlled such that, for example, a temperature of ink passing through the second heater 77 is adjusted toward 35° C. as a desired temperature, by switching between an ON state and an OFF state.

Meanwhile, each of the first heater 76 and the second heater 77 is electrically connected to the control unit 9. The first heater 76 and the second heater 77 each output data regarding a ratio of a time period of an ON state to a unit time period, to the control unit 9. Note that the unit time period is, for example, one second. Hereinafter, the ratio of a time period of an ON state to a unit time period will be referred to as a “duty value”. Note that, in the present invention, the number of heaters interposed between the circulation pump 71 and the supply tank 51 in the feedback pipe 65 may be one or three or larger. That is, any heater that is interposed between the circulation pump 71 and the supply tank 51 in the feedback pipe 65 and heats ink flowing from the collecting tank 52 to the supply tank 51 can be used.

The first temperature sensor 84 is interposed on the downstream side of the feedback-side on-off valve 75 with respect to the ink delivery direction and on the upstream side of the first heater 76 with respect to the ink delivery direction in the feedback pipe 65. The first temperature sensor 84 detects a temperature of ink flowing into the first heater 76. Further, the first temperature sensor 84 is electrically connected to the control unit 9. The first temperature sensor 84 outputs data regarding a result of detection of an ink temperature, to the control unit 9.

The second temperature sensor 85 is interposed on the downstream side of the first heater 76 with respect to the ink delivery direction and on the upstream side of the second heater 77 with respect to the ink delivery direction in the feedback pipe 65. The second temperature sensor 85 detects a temperature of ink flowing out of the first heater 76. Further, the second temperature sensor 85 is electrically connected to the control unit 9. The second temperature sensor 85 outputs data regarding a result of detection of an ink temperature, to the control unit 9.

The third temperature sensor 86 is interposed on the downstream side of the second heater 77 with respect to the ink delivery direction and on the upstream side of the supply tank 51 with respect to the ink delivery direction in the feedback pipe 65. The third temperature sensor 86 detects a temperature of ink flowing out of the second heater 77. Further, the third temperature sensor 86 is electrically connected to the control unit 9. The third temperature sensor 86 outputs data regarding a result of detection of an ink temperature, to the control unit 9. Note that the first temperature sensor 84, the second temperature sensor 85, and the third temperature sensor 86 described above are not necessarily required to be provided.

The filter 87 is interposed on the downstream side of the second heater 77 with respect to the ink delivery direction and on the upstream side of the supply tank 51 with respect to the ink delivery direction in the feedback pipe 65. The filter 87 filters ink delivered through the internal passage of the feedback pipe 65, to remove foreign matters included in the ink.

The deaeration unit 88 is interposed on the downstream side of the filter 87 with respect to the ink delivery direction and on the upstream side of the supply tank 51 with respect to the ink delivery direction in the feedback pipe 65. The deaeration unit 88 of the present preferred embodiment is a so-called hollow-fiber membrane deaeration module. The deaeration unit 88 removes bubbles in ink delivered through the internal passage of the feedback pipe 65.

Figure 3:
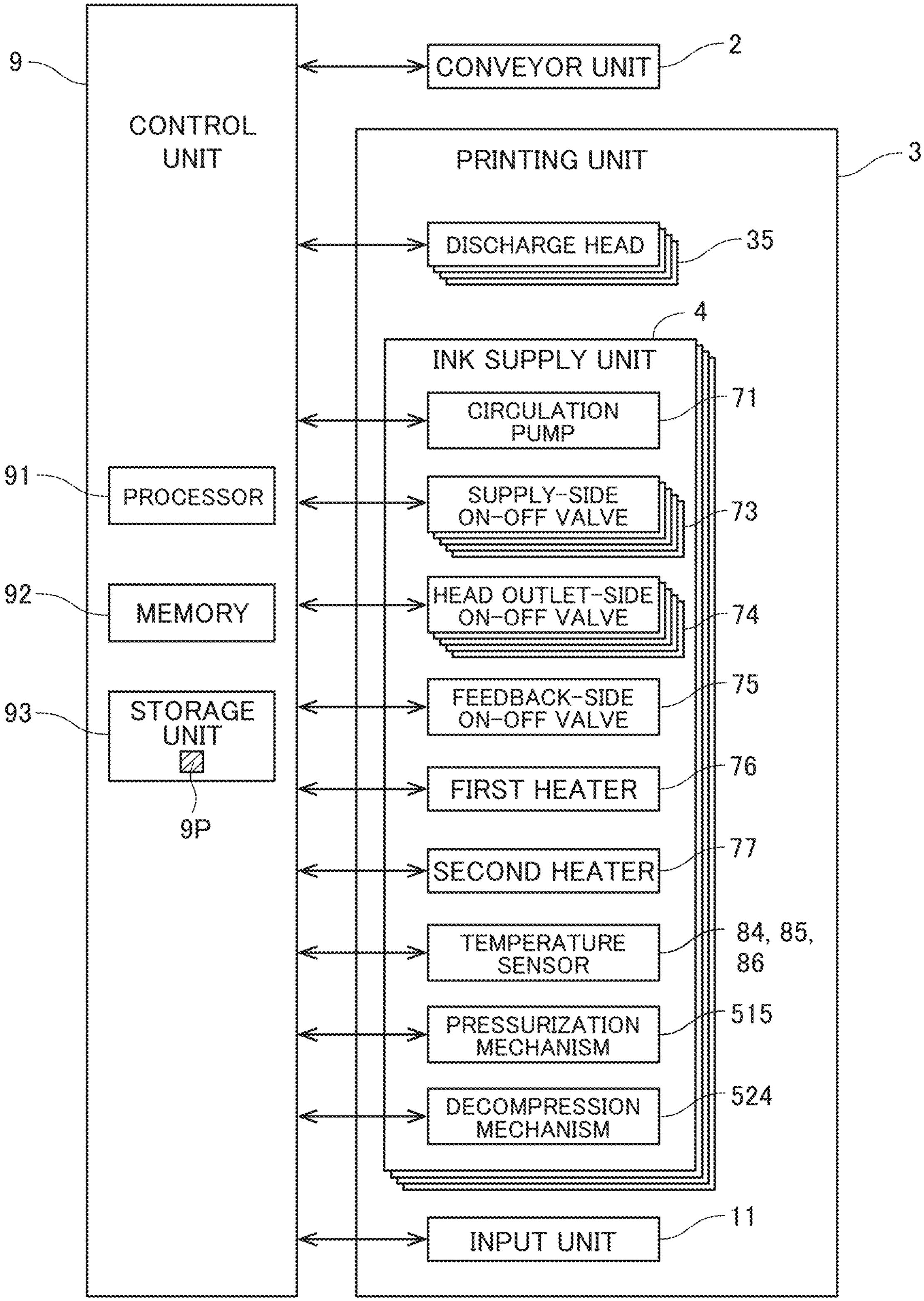
FIG. 3 is a block diagram showing connection between a control unit and each component of the inkjet printing apparatus.

Next, the control unit 9 is described. The control unit 9 is an information processing device configured to control each component of the inkjet printing apparatus 1. FIG. 3 is a block diagram showing connection between the control unit 9 and each component of the inkjet printing apparatus 1. As conceptually shown in FIG. 3, the control unit 9 includes a processor 91 such as a CPU, a memory 92 such as a RAM, and a storage unit 93 such as a hard disk drive. In the storage unit 93, a computer program 9P for performing conveyance of the continuous paper 10, printing on the continuous paper 10, and ink circulation, and for stopping ink circulation in response to a command described later, is stored.

Further, as shown in FIG. 3, the control unit 9 is electrically connected to the conveyor unit 2 and the four discharge heads 35 of the printing unit 3, and is further electrically connected to the circulation pump 71, the five supply-side on-off valves 73, the five head outlet-side on-off valves 74, the feedback-side on-off valve 75, the first heater 76, the second heater 77, the respective temperature sensors 84, 85, and 86, the pressurization mechanism 515, and the decompression mechanism 524 of each of the four ink supply units 4 of the printing unit 3, such that the control unit 9 can conduct communication to/from the above-described components. The control unit 9 controls operations of those components in accordance with the computer program 9P.

Moreover, as shown in FIG. 3, the control unit 9 is electrically connected to the input unit 11 such that the control unit 9 can conduct communication to/from the input unit 11. The input unit 11 is a device configured to receive a command for stopping driving the circulation pump 71. The input unit 11 includes an input interface such as a touch panel, for example. An operator inputs a command for, for example, stopping driving the circulation pump 71 to the input unit 11 via the input interface. Then, upon receipt of the command, the input unit 11 outputs a signal regarding the command to the control unit 9. Note that the input unit 11 may be formed integrally with the control unit 9 or another unit. The control unit 9 controls operations of the above-described components, to perform conveyance of the continuous paper 10, printing on the continuous paper 10, and ink circulation in the circulation path 41, and further, stop ink circulation with a time lag in response to the signal as described later.

<2. Procedure for Conveyance of Continuous Paper, Printing, Ink Circulation, and Stop of Ink Circulation>

Figure 4:
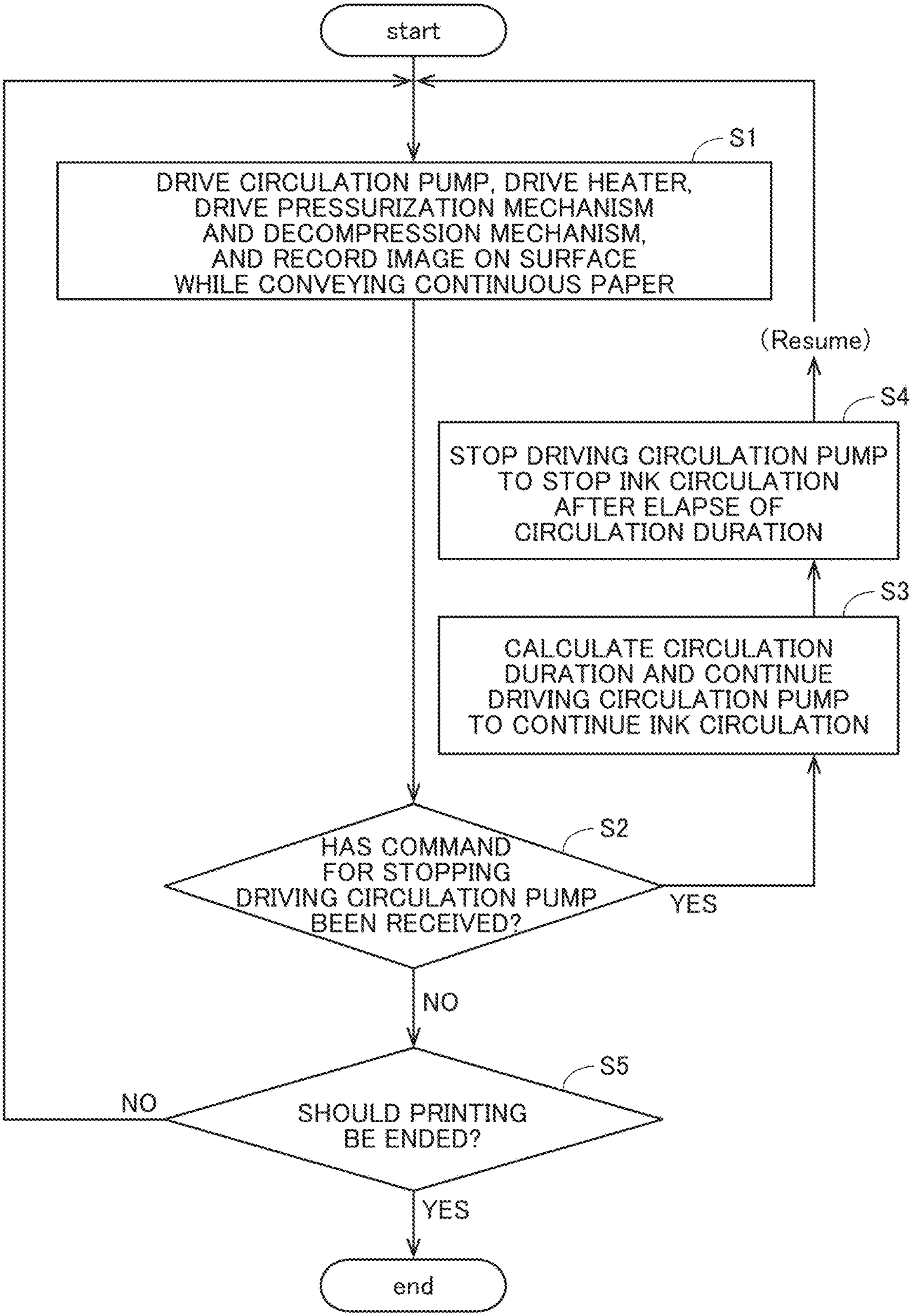
FIG. 4 is a flowchart showing a procedure for conveyance of continuous paper, printing on the continuous paper, ink circulation, and stop of ink circulation.

Next, description is given about a procedure for conveyance of the continuous paper 10, printing on the continuous paper 10, ink circulation, and stop of ink circulation that are performed in the inkjet printing apparatus 1. FIG. 4 is a flowchart showing a procedure for conveyance of the continuous paper 10, printing on the continuous paper 10, ink circulation, and stop of ink circulation.

In performing conveyance of the continuous paper 10, printing on the continuous paper 10, and ink circulation, the control unit 9 first causes the conveyor unit 2 to operate, to convey the continuous paper 10 along the predetermined conveying path in the length direction. Then, the control unit 9 controls the plurality of nozzles 83 of each of the four discharge heads 35 such that ink droplets are discharged onto the surface of the continuous paper 10. Thus, an image is recorded on the surface of the continuous paper 10 (step S1).

Meanwhile, as advance preparation for conveyance of the continuous paper 10, printing on the continuous paper 10, and ink circulation, a sufficient amount of ink is stored in the internal chamber 510 of the supply tank 51. Further, the control unit 9 opens the five supply-side on-off valves 73, the five head outlet-side on-off valves 74, and the feedback-side on-off valve 75.

Then, the control unit 9 drives the circulation pump 71, the first heater 76, the second heater 77, the pressurization mechanism 515, and the decompression mechanism 524 of each of the four ink supply units 4. Further, the first temperature sensor 84, the second temperature sensor 85, and the third temperature sensor 86 are turned on the power of them, and thus, those temperature sensors start measuring. That is, the control unit 9 drives the circulation pump 71 to circulate ink through the ink circulation path 41, while driving the pressurization mechanism 515 and the decompression mechanism 524 to supply ink to the internal tank 82 of each discharge head 35.

More specifically, when the pressurization mechanism 515 and the decompression mechanism 524 are driven, a pressure difference is generated between the internal chamber 510 of the supply tank 51 and the internal chamber 520 of the collecting tank 52. As a result, ink stored in the supply tank 51 can be supplied to the discharge heads 35, and further, ink remaining in the discharge heads 35 can be collected into the collecting tank 52. Note that the ink remaining in the discharge heads 35 is ink being left undischarged in the discharge heads 35. Further, when the circulation pump 71 is driven, there is generated ink flow from the collecting tank 52 to the supply tank 51 in the internal passage of the feedback pipe 65.

Meanwhile, a volume of a portion where ink passes in the supply tank 51, the collecting tank 52, the supply-side manifold 61, each of the supply-side narrow pipes 62, each of the collecting-side narrow pipes 63, the collecting-side manifold 64, and the feedback pipe 65 on the ink circulation path 41 is a preset value. Hence, a flow rate of ink circulating through the circulation path 41 can be calculated from a pumping rate of the circulation pump 71 that delivers ink, per unit time period, and a pressure of the internal chamber 510 of the supply tank 51 and a pressure of the internal chamber 520 of the collecting tank 52 that are adjusted by the pressurization mechanism 515 and the decompression mechanism 524. Note that the pumping rate of the circulation pump 71 per unit time period can be calculated from the above-described "pump duty value".

On this basis, the inkjet printing apparatus 1 has a configuration that allows the operator to select a "high-speed circulation mode" or a "low-speed circulation mode" for a flow rate of ink circulating through the circulation path 41. When the "high-speed circulation mode" is selected, the circulation pump 71 is controlled such that, for example, the pump duty value is "100%". Further, the pressurization mechanism 515 is controlled such that, for example, a pressure of the internal chamber 510 of the supply tank 51 is "+10 kPa". Moreover, the decompression mechanism 524 is controlled such that, for example, a pressure of the internal chamber 520 of the collecting tank 52 is "−10 kPa". As a result of this, a flow rate of ink in the circulation path 41 of the present preferred embodiment is, for example, 800 (ml/min).

Meanwhile, when the "low-speed circulation mode" is selected, the circulation pump 71 is controlled such that, for example, the pump duty value is "50%". Further, the pressurization mechanism 515 is controlled such that, for example, a pressure of the internal chamber 510 of the supply tank 51 is "+3 kPa". Moreover, the decompression mechanism 524 is controlled such that, for example, a pressure of the internal chamber 520 of the collecting tank 52 is "−3 kPa". As a result of this, a flow rate of ink in the circulation path 41 of the present preferred embodiment is, for example, 300 (ml/min).

Alternatively, for a flow rate of ink circulating through the circulation path 41, there may be provided one mode or three or more modes in each of which the pump duty value and the values of pressures of the internal chambers 510 and 520 are different from the above-mentioned values, in addition to the "high-speed circulation mode" and the "low-speed circulation mode". Further alternatively, a flowmeter may be additionally provided in order to measure a flow rate of ink in the circulation path 41.

Further, by driving the first and second heaters 76 and 77, it is possible to heat ink delivered through the internal passage of the feedback pipe 65 and then deliver the heated ink to the supply tank 51. More specifically, the control unit 9 first switches the first heater 76 between an ON state and an OFF state, to control a temperature of ink passing through the first heater 76, at 30° C., for example. To this end, as described above, the second temperature sensor 85 detects a temperature of ink flowing out of the first heater 76 and outputs data regarding a result of the detection to the control unit 9. The control unit 9 adjusts a driving amount of the first heater 76 in accordance with the result of the detection of the ink temperature received from the second temperature sensor 85.

Figure 5:
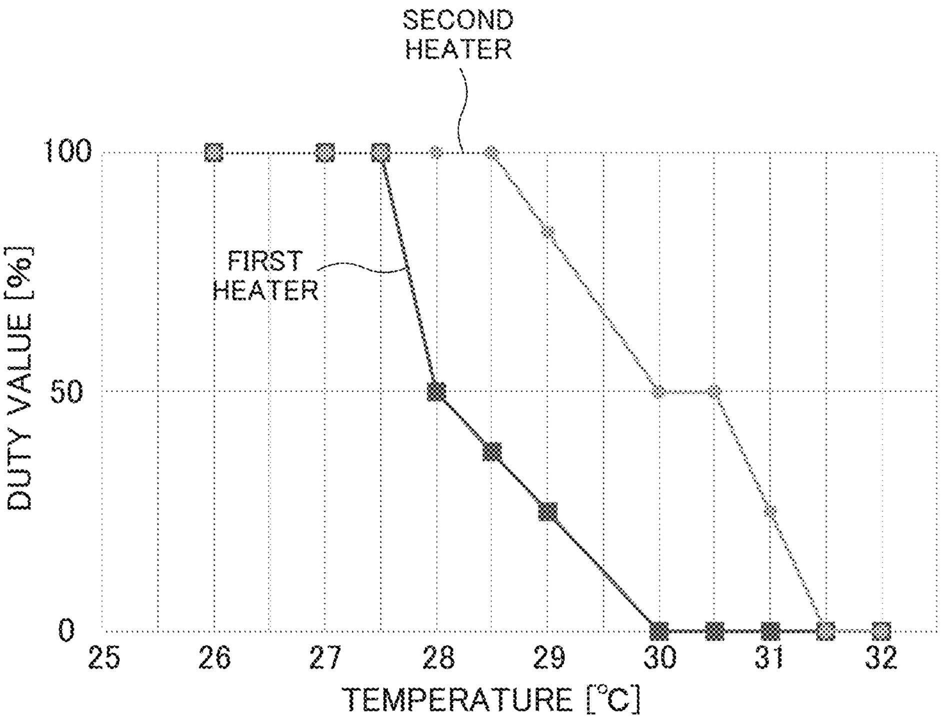
FIG. 5 is a view showing a relationship between a temperature of ink passing through a heater and a duty value of the heater, plotted against the temperature.

FIG. 5 is a view showing an example of a ratio of a time period of an ON state to a unit time period in driving each of the first and second heaters 76 and 77, plotted against a temperature of ink passing through each of the first and second heaters 76. Note that the unit time period is, for example, one second. In other words, FIG. 5 is a view showing an example of a "duty value" in driving each of the first and second heaters 76 and 77, plotted against a temperature of ink passing through each of the first and second heaters 76 and 77. As shown in FIG. 5, when a temperature of ink passing through the first heater 76 is lower than 27.5° C., the control unit 9 drives the first heater 76 at a duty value of 100%. When the temperature of ink passing through the first heater 76 becomes equal to or higher than 27.5° C., the control unit 9 gradually decreases the duty value. Then, when the temperature of ink becomes equal to or higher than 28° C., the control unit 9 drives the first heater 76 at a duty value of 50% or smaller. Further, when the temperature of ink passing through the first heater 76 becomes equal to or higher than 30° C., the control unit 9 drives the first heater 76 at a duty value of 0%. In other words, when the temperature of ink passing through the first heater 76 becomes equal to or higher than 30° C., the control unit 9 stops driving the first heater 76. By the above-described control, the temperature of ink passing through the first heater 76 can be adjusted to 30° C.

Meanwhile, the control unit 9 performs control in which a temperature of ink passing through the second heater 77 becomes equal to, for example, 35° C." by switching the second heater 77 between an ON state and an OFF state. As described above, the third temperature sensor 86 detects a temperature of ink flowing out of the second heater 77, and outputs data regarding a result of the detection, to the control unit 9. The control unit 9 adjusts a driving amount of the second heater 77 in accordance with the result of the detection of the ink temperature received from the third temperature sensor 86.

As shown in FIG. 5, when a temperature of ink passing through the second heater 77 is lower than 28.5° C., the control unit 9 drives the second heater 77 at a duty value of 100%. When the temperature of ink passing through the second heater 77 becomes equal to or higher than 28.5° C., the control unit 9 gradually decreases the duty value. Then, when the temperature of ink becomes equal to or higher than 30° C., the control unit 9 drives the second heater 77 at a duty value of 50% or smaller. Further, when the temperature of ink passing through the second heater 77 becomes equal to or higher than 31.5° C., the control unit 9 drives the second heater 77 at a duty value of 0%. In other words, when the temperature of ink passing through the second heater 77 becomes equal to or higher than 31.5° C., the control unit 9 stops driving the second heater 77. By the above-described control, the temperature of ink passing through the second heater 77 can be adjusted to 35° C. The adjustment of the temperature of ink passing through the second heater 77 to 35° C. allows the discharge heads 35 to satisfactorily discharge ink afterward.

Meanwhile, as described above, the first temperature sensor 84 detects a temperature of ink flowing into the first heater 76, and outputs data regarding a result of the detection, to the control unit 9. The control unit 9 can find at what temperature ink has originally flowed into the first heater 76, by referring to the data regarding the result of the detection provided from the first temperature sensor 84. This serves as a measure to determine whether the first heater 76 and the second heater 77 normally operate. Further, historical data of the driving amounts (duty values) given to the first heater 76 and the second heater 77 by the control unit 9 is stored in the memory 92 so that the driving amounts can be referred back to at any appropriate time.

Further, ink flowing through the internal passage of the feedback pipe 65 is caused to pass through the filter 87, and thus, ink from which small impurities or the like remaining therein have been removed can be delivered to the supply tank 51. Moreover, ink flowing through the internal passage of the feedback pipe 65 is caused to pass through the deaeration unit 88, and thus ink having been deaerated can be delivered to the supply tank 51.

Here, the circulation pump 71 is stopped operating in some cases such as a case in which switching between the "high-speed circulation mode" and the "low-speed circulation mode" described above is performed and a case in which an operation of wiping out stains on the discharge heads 35 is performed. In such a case, ink circulation in the circulation path 41 is stopped, and thus ink stays in each of the first and second heaters 76 and 77. Further, power supply to the first and second heaters 76 and 77 is interrupted.

In this regard, as described above, each of the first and second heaters 76 and 77 includes a heating element formed of a carbon heater or the like. The heating element is kept at a high temperature also after interruption of power supply to the first and second heaters 76 and 77. Hence, to leave ink circulation stopped for a certain time period would result in overheating ink staying in the first and second heaters 76 and 77, so that the ink might possibly be changed in quality or deteriorated. Further, to use ink having been changed in quality or deteriorated afterward would cause a fear that ink might not be satisfactorily discharged from the discharge heads 35 or a desired color gamut might not be obtained. For this reason, in the present preferred embodiment, the following process is performed before the circulation pump 71 is stopped operating.

Specifically, the operator first inputs a command for stopping driving the circulation pump 71 via the input interface of the input unit 11. Then, upon receipt of the command, the input unit 11 outputs a signal regarding the command to the control unit 9. The control unit 9 detects whether the signal regarding the command has been received from the input unit 11 (step S2). The control unit 9 continues conveyance of the continuous paper 10, printing on the continuous paper 10, and ink circulation until it is detected that the signal regarding the command has been received from the input unit 11 (step S2: NO).

On the other hand, when it is detected that the signal regarding the command has been received from the input unit 11 (step S2: YES), the control unit 9 refers to each of a duty value of the first heater 76 and a duty value of the second heater 77 for a predetermined time period before it is detected that the signal regarding the command has been received from the input unit 11. Note that the predetermined time period is, for example, one second. However, the duty values vary in some cases as described above, and thus, the control unit 9 may set a time period of a few minutes as the predetermined time period. In this case, the control unit 9 may refer to a value calculated as an average value per unit time period, the value being obtained by division of an integral value of duty values of each of the first and second heaters 76 and 77 for the predetermined time period, by the predetermined time period.

Note that, when duty values of the first and second heaters 76 and 77 for the above-described predetermined time period are large, the control unit 9 determines that the heating elements have already generated much heat and the temperatures are high in the first and second heaters 76 and 77. In such a case, the control unit 9 determines that ink staying in the first and second heaters 76 and 77 are highly likely to be overheated and be changed in quality or deteriorated by immediate stop of ink circulation in the circulation path 41.

Further, the control unit 9 refers to whether the "high-speed circulation mode" or the "low-speed circulation mode" has been selected for a flow rate of ink circulating through the circulation path 41 for the above-described predetermined time period. Then, the control unit 9 grasps a flow rate Qi (ml/min) of ink circulating through the circulation path 41 for the predetermined time period on the basis of the result of referring. For example, when the "high-speed circulation mode" is selected for the predetermined time period, the flow rate of ink is 800 (ml/min). When the "low-speed circulation mode" is selected for the predetermined time period, the flow rate of ink is 300 (ml/min). Alternatively, the flow rate of ink circulating through the circulation path 41 may be grasped on the basis of a result of measurement provided by a flowmeter additionally provided.

Subsequently, the control unit 9 calculates a circulation duration ΔT (s), by substituting the above-described flow rate Qi (ml/min) of ink having been grasped and a value D1 (%) that is the larger of the respective duty values of the first heater 76 and the second heater 77 for the above-described predetermined time period, into the following expression (1). Then, the control unit 9 continues driving the circulation pump 71 for the circulation duration ΔT (s) to perform ink circulation in the circulation path 41 also after it is detected that the above-described signal has been received (step S3). Note that, in the expression (1), "Ks" represents a coefficient determined in advance by a length of the ink circulation path 41, an inner diameter of the feedback pipe 65, and the like.

$$\Delta T(s) = Ks \times D1(\%) \div Qi \ (\text{ml/min}) \qquad \text{Expression (1)}$$

Then, after the elapse of the circulation duration ΔT (s), the control unit 9 stops driving the circulation pump 71, to stop ink circulation in the circulation path 41 (step S4). That is, the control unit 9 of the present preferred embodiment can sequentially perform a step (a), upon receipt of a signal regarding a command for stopping driving the circulation pump 71 from the input unit 11, stopping driving the first and second heaters 76 and 77 and determining the circulation duration ΔT (s) for which the circulation pump 71 is kept operating and ink circulation in the circulation path 41 is continued from the time of receipt of the signal, on the basis of the duty values of the first and second heaters 76 and 77 for a predetermined time period before the time of receipt of the signal and the flow rate of ink in the circulation path 41 for the predetermined time period, and a step (b) of stopping driving the circulation pump 71 after the elapse of the circulation duration ΔT (s) from the time of receipt of the signal.

In this manner, in the present preferred embodiment, in a case in which a command for stopping ink circulation is received, the first and second heaters 76 and 77 are stopped operating, and ink circulation is continued for a predetermined time period. Thus, the temperatures of the first and second heaters 76 and 77 can be reduced. This makes it possible to suppress a change in quality or the like of ink left in the first and second heaters 76 and 77. This enables reduction of an amount of waste ink having been changed in quality or the like and an amount of waste paper caused by a printing failure in the continuous paper 10. Further, in the present preferred embodiment, the circulation duration ΔT (s) for which ink circulation is continued is determined on the basis of the duty values of the first and second heaters 76 and 77 and a flow rate of ink, and therefore the circulation duration ΔT (s) can be minimized.

Moreover, as is clear from the expression (1), the circulation duration ΔT (s) is proportional to the value D1 (%) that is the larger of the respective duty values of the first heater 76 and the second heater 77 for the above-described predetermined time period. That is, the circulation duration ΔT (s) is proportional to the duty values of the first and second heaters 76 and 77 for the predetermined time period. This is because large duty values of the first and second heaters 76 and 77 for the above-described predetermined time period are considered to mean generation of much heat and high temperatures of the heating element in the first and second heaters 76 and 77 and it is thus required to continue ink circulation for an accordingly prolonged time period.

Further, the control unit 9 substitutes the value D1 (%) that is the larger of the duty values of the first heater 76 and the second heater 77 for the above-described predetermined time period, into the expression (1). Thus, even in a case in which one of the heating elements in the first heater 76 and the second heater 77 generates extremely much heat and the temperature is high, the temperature of the one heating element can be sufficiently reduced. Consequently, a change in quality or the like of ink left near the one heating element can be sufficiently reduced.

Meanwhile, as is clear from the expression (1), the circulation duration ΔT (s) is inversely proportional to the flow rate Qi (ml/min) of ink in the circulation path 41 for the above-described predetermined time period. This is because the higher the flow rate Qi (ml/min) of ink is, the more ink can be brought close to the heating elements in the first and second heaters 76 and 77 during ink circulation and the sooner the temperatures of the heating elements in the first and second heaters 76 and 77 can be reduced. Consequently, the temperatures of the first and second heaters 76 and 77 can be efficiently reduced, which shortens the circulation duration ΔT (s) and improves the workability.

Subsequently, power supply to the inkjet printing apparatus 1 is resumed, and the control unit 9 drives the circulation pump 71 again in performing conveyance of the continuous paper 10, printing on the continuous paper 10, and ink circulation. Further, the control unit 9 performs conveyance of the continuous paper 10, printing on the continuous paper 10, and ink circulation while resuming driving the first and second heaters 76 and 77.

As shown in FIG. 4, after that, the control unit 9 determines whether to end conveyance of the continuous paper 10 and printing (step S5). The control unit 9 continues conveyance of the continuous paper 10 and printing when there remains image data to be printed (step S5: NO). After a while, when there is no image data to be printed (step S5: YES), the control unit 9 stops operations of each component and ends conveyance of the continuous paper 10, printing on the continuous paper 10, and ink circulation.

<3. Modifications>

Hereinabove, the preferred embodiment of the present invention has been described, but the present invention is not limited to the above-described preferred embodiment.

Further, the respective elements described in the above-described preferred embodiment may be appropriately combined unless contradiction occurs.

While the invention has been shown and described in detail, the foregoing description is in all aspects illustrative and not restrictive. It is therefore understood that numerous modifications and variations can be devised without departing from the scope of the invention.

What is claimed is:

1. An inkjet printing apparatus that discharges ink onto a printing medium to perform printing, comprising:

an ink circulation path including a discharge head configured to discharge ink, a supply tank in which ink supplied to the discharge head is stored, a collecting tank in which ink collected from the discharge head is stored, and a feedback pipe connecting the collecting tank and the supply tank;

a circulation pump that is interposed in the feedback pipe and is configured to deliver ink from the collecting tank to the supply tank via the feedback pipe;

a heater that is interposed in the feedback pipe and is configured to heat ink flowing from the collecting tank to the supply tank;

an input unit configured to receive a command for stopping driving the circulation pump; and a control unit electrically connected to each of the circulation pump, the heater, and the input unit, wherein the control unit is capable of sequentially performing a step (a) of, upon receipt of a signal regarding the command from the input unit, stopping driving the heater, and determining a circulation duration for which the circulation pump is kept operating and ink circulation in the circulation path is continued from a time of receipt of the signal, on the basis of a duty value of the heater for a predetermined time period before the time of receipt of the signal and a flow rate of ink in the circulation path for the predetermined time period, and a step (b) of stopping driving the circulation pump after elapse of the circulation duration from the time of receipt of the signal.

2. The inkjet printing apparatus according to claim 1, wherein the circulation duration is inversely proportional to the flow rate of ink in the circulation path for the predetermined time period.

3. The inkjet printing apparatus according to claim 1, wherein the circulation duration is proportional to the duty value of the heater for the predetermined time period.

* * * * *